Nov. 30, 1937.  J. S. PARSONS  2,100,721
BURIED TYPE DISTRIBUTION TRANSFORMER
Filed June 26, 1936   2 Sheets-Sheet 1
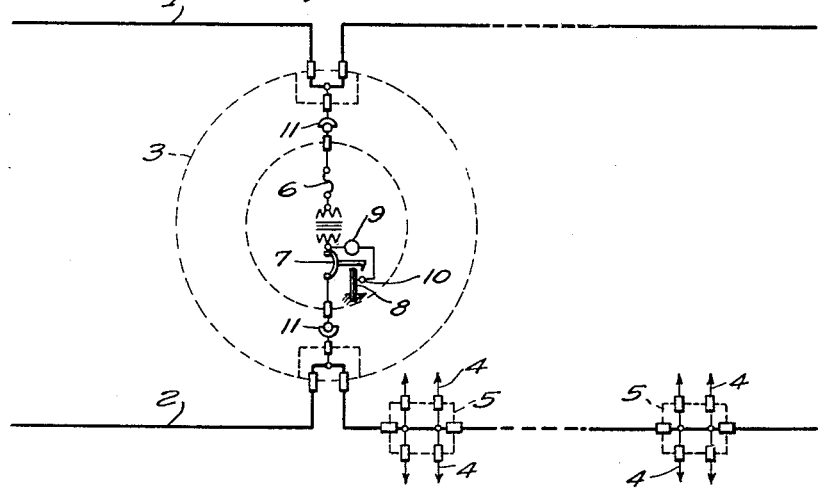
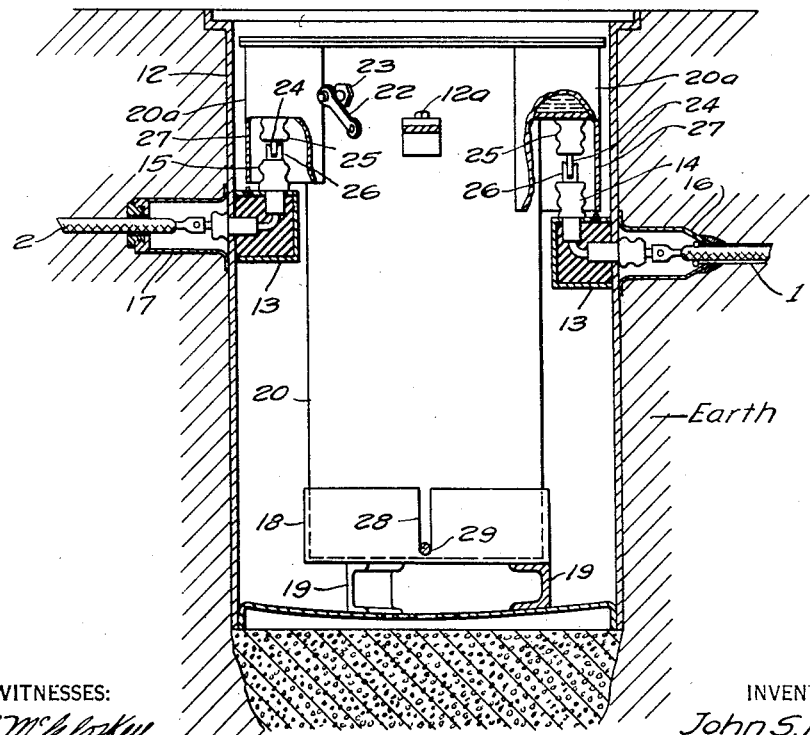
WITNESSES:
E. A. McCloskey
G. C. Harrison
INVENTOR
John S. Parsons
BY
ATTORNEY Nov. 30, 1937. J. S. PARSONS 2,100,721
BURIED TYPE DISTRIBUTION TRANSFORMER
Filed June 26, 1936    2 Sheets-Sheet 2
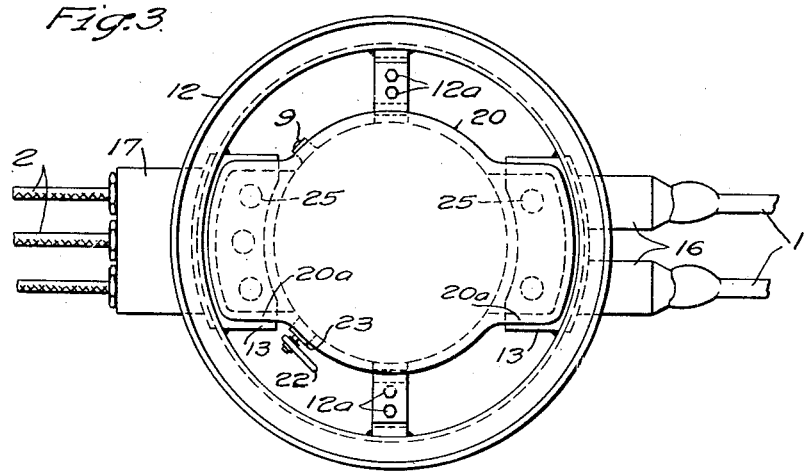
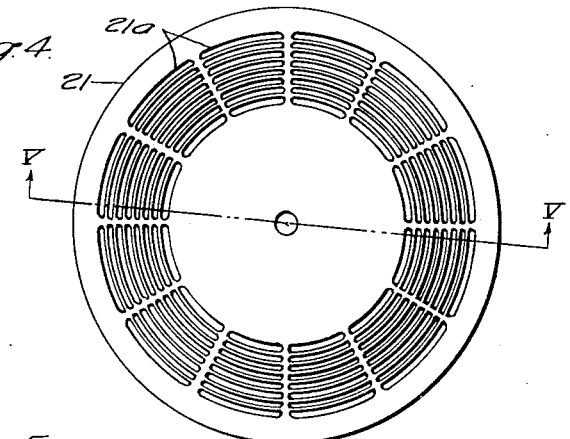
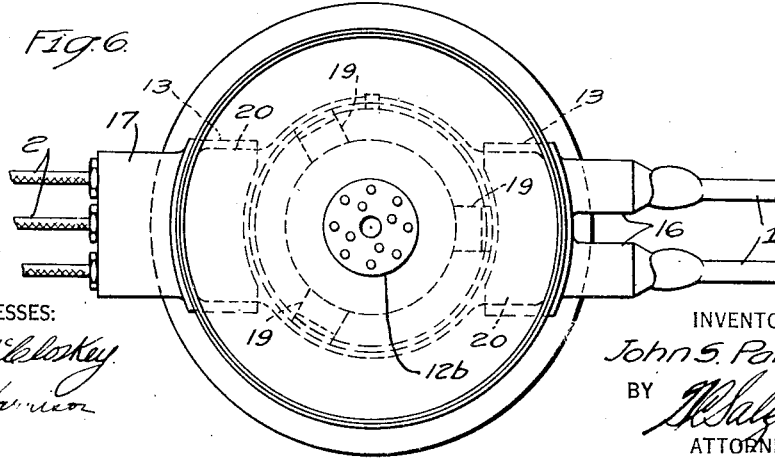
WITNESSES:
E. A. McCloskey
INVENTOR
John S. Parsons.
BY
ATTORNEY Patented Nov. 30, 1937

2,100,721

UNITED STATES PATENT OFFICE 2,100,721

BURIED TYPE DISTRIBUTION TRANSFORMER

John S. Parsons, Swissvale, Pa., assignor to Westinghouse Electric & Manufacturing Company, East Pittsburgh, Pa., a corporation of Pennsylvania Application June 26, 1936, Serial No. 87,372

6 Claims. (Cl. 247—4)

My invention relates to underground alternating-current distribution apparatus and particularly to a novel low cost distribution transformer of the general type disclosed in my prior United States Patent No. 2,024,742, issued December 17, 1935, and assigned to the Westinghouse Electric & Manufacturing Company. In this patent, there is disclosed an underground distribution transformer unit having an outer metal housing buried in the soil, and open to the atmosphere through manhole openings. An inner casing containing the transformer induction apparatus and a transformer oil or liquid cooling medium, is mounted within the housing in spaced relationship therefrom to permit free circulation of atmospheric air through the transformer unit. This arrangement permits the transformer heat losses to be dissipated partly by air circulation and partly by conduction to the earth without the soil surrounding the transformer becoming baked and heat insulating.

Although underground distribution systems are at present used principally in metropolitan and heavy density load areas, there is a very definite need for some form of low-cost underground distribution system to serve residential and other areas now fed by overhead systems. While it may not be possible to develop an underground system whose first cost is as low as that of an overhead system, it does appear feasible to develop such a system which will be competitive with the usual overhead system when all factors are considered. The underground system will be free from service interruptions and accompanying expense due to damage from lightning, sleet and wind storms. Its life will be longer than that of the poles and cross arms in an overhead system. There is no expense for tree trimming, which in many cases is considerable in overhead systems. The improved appearance effected by the removal of poles, wires, and transformers is another desirable feature of the underground system. Stated briefly, the advantages of an underground system are longer life, lower operating and maintenance costs, greater safety and improved public relations because of improved appearance.

It is an object of my invention to provide a novel distribution transformer for underground service in medium and low density areas which can be installed at low cost, and easily and quickly removed from service for inspection or repairs.

A further object of my invention is to provide a novel buried-type distribution transformer having quickly-detachable connections which will provide adequate protection for the exposed connections against the effects of surface water.

Other objects of my invention will become evident from the following detailed description taken in conjunction with the accompanying drawings, in which:

Figure 1 is a single-line diagrammatic view showing a preferred cable arrangement in an underground distribution system using transformers embodying my invention;

Fig. 2 is a sectional elevational view showing a transformer installation embodying the invention, in operative position, buried in the earth;

Fig. 3 is a plan view of the installation of Fig. 2, removed from the ground;

Fig. 4 is a plan view of a preferred form of manhole cover for the installation of Figs. 2 and 3;

Fig. 5 is a sectional view of the manhole cover shown in Fig. 4; and

Fig. 6 is a worm's-eye plan view of the installation of Figs. 2 and 3, showing the relative positions of drain openings and transformer supports.

Referring to Fig. 1, the primary cable 1 and secondary cable 2 are laid out parallel to the street being served, preferably, and buried distribution transformers, such as 3, are connected to the primary cable 1 at suitable points for supplying groups of loads such as domestic loads. The individual loads are supplied by means of conductors 4, which are connected to the secondary cable 2 by means of junction boxes 5.

The primary and secondary cables 1 and 2 may be buried directly in the earth or may be carried in a suitable buried conduit such as that known in the art as a "pump log", or may be installed in buried pipes filled with oil under pressure.

The transformer 3 is protected by means of primary fuses, indicated diagrammatically at 6, and by a secondary thermal circuit breaker 7, having its thermal element 8 located under the transformer oil or cooling fluid, at a position to respond to a temperature effect dependent both on the oil temperature and the temperature of a load conductor. The circuit breaker 7 is designed to trip when the hot spot temperature of the transformer 3 reaches values, which, if they persisted, would seriously damage the insulation.

An indicating lamp 9, visible externally to the transformer installation, as will be explained in connection with Figs. 2 and 3, is provided for indicating a heavily loaded condition of the transformer 3 such that the transformer should be watched, and possible steps taken to relieve it of some load or install a larger transformer. The indicating lamp 9 is controlled by means of auxiliary contacts 10 of the circuit breaker 7, arranged to close when the hot spot temperature is somewhat below the tripping value.

The transformer 3 is provided with detachable connections, indicated diagrammatically at 11, which will be described in detail in connection with Figs. 2 and 3.

Referring to Figs. 2 and 3, an outer cylindrical housing 12, preferably of weather resistant ferric material, such as wrought iron, is buried in the earth or under the street to a depth such that its upper edge is approximately flush with the earth or street surface. The housing 17 is provided with internal compartments 13, welded thereto, to which primary bushings 14 and secondary bushings 15 are secured. Primary potheads 16 and secondary potheads 17, for leading in the primary cables 1 and secondary cables 2, respectively, are bolted or otherwise suitably secured to the housing 12. The compartments 13 and potheads 16 and 17 are filled with insulating compound in accordance with the usual practice. The primary pothead 16 is shown as designed for a wiped-joint connection with lead covered primary cables 1, but may be of other known designs for use with other forms of cable.

A supporting ring 18, preferably of suitable ferric material, is supported in the bottom of the housing 12, by means of three supporting angles 19, in a position to center an inner tank or casing 20. The angles 19 are preferably welded to the housing 12 and to the ring 18 to form a rugged unitary structure. The casing 20 may be rigidly bolted on the housing 12 by means of bolts 12a.

A manhole cover 21 (Figs. 4 and 5) is provided for closing the upper open end of the housing 12. The manhole cover 21 is provided with ventilating openings 21a permitting the free circulation of air around the inner transformer casing 12 and also allowing the indicating lamp 9 to be viewed from the sidewalk or earth's surface. A removable perforated drain 12b (Fig. 6) is provided in the bottom of housing 12 to allow surface water to drain out of the housing.

The inner casing 20 contains the transformer induction apparatus (shown diagrammatically in Fig. 1) and various auxiliaries such as the fuses 6 and circuit breaker 7. This casing is filled to a predetermined level with suitable cooling fluid, such as transformer oil, or one of the halogenated cyclic hydrocarbon compounds used for cooling and insulation.

An operating handle 22 for manually tripping and closing the circuit breaker 7 is mechanically connected to the latter through a water-tight gland 23. The handle 22 is readily accessible by removing the manhole cover 21.

The casing 20 is provided with overhung portions 20a, in the lower sides of which blade-type transformer terminals 24 are mounted by means of bushings 25. The blade-type transformer terminals 24 are properly spaced to engage mating jaw type cable terminals 26 secured to the compartments 13 by means of the bushings 14 and 15. The transformer terminals 24 and cable terminals 26 are designed to establish solid electrical connections of the transformer 3 upon vertical lowering movement of the casing 20 into operative position in the housing 12.

Air-tight bells 27, open at the bottom, are welded or otherwise suitably secured to the casing 20 in positions to surround the transformer terminals 24 and cable terminals 26 when the latter are in engagement. In operation, the housing 12 may at times become partially or completely filled with surface water, and the bells 27 then form air pockets which prevent the water from reaching the exposed surfaces of the terminals 24 and 26. The drain 12b allows the accumulated surface water to gradually soak into the soil.

Should the transformer proper become damaged, the casing 20 can readily be lifted out of the housing 12 by removing the manhole cover 21 and bolts 12a, and a new transformer and casing lowered into place without disturbing any connections. In removing the casing 20, the handle 22 is first operated to open the circuit breaker 7, thereby interrupting the load current before the transformer terminals 24 and cable terminals 26 are separated by raising the casing 20. In this way injury to the terminals or accidents caused by power arcs are avoided.

When lowering a new transformer and casing into place, the ring 18 serves as guide. This ring has a slot 28 in which a pin 29 welded to the casing 20 must slide before the casing 20 can be lowered into position. This insures proper engagement of the transformer terminals 24 and cable terminals 26. Lifting lugs (not shown) may be supplied on the housing 12 and casing 20 to facilitate handling.

The entire transformer shown in Figs. 2 and 3 is a complete portable unit. To make the initial installation, a hole is dug, some crushed rock or gravel placed in the bottom of it, and the entire unit is lowered into position so that the cover 21 of the outer housing 12 is flush with street or ground. The primary cables 1 and secondary cables 2 are then connected to the potheads 16 and 17, respectively. The earth is then filled in around the transformer, and the latter is ready for service. Before the unit is lowered into the hole, the outside surface of the housing 12 may be given some protective coating such as an asphalt or pitch compound, such as is used on oil pipe lines.

The operation of the unit as a whole is similar to that of the usual distribution transformer and requires no description.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In an underground alternating-current distribution system having buried cables, a transformer unit comprising a metal housing buried in the soil, said housing having a manhole opening in the top thereof communicating with the atmosphere, an inner metal casing adapted for mounting in said housing in spaced relationship therefrom, said casing having an overhanging portion, and having induction apparatus and a cooling fluid enclosed therein, transformer terminals secured to the under side of said overhanging portion in a position substantially inaccessible manually from said manhole opening, and cable terminals electrically connected to said cables and secured in insulated relationship to said housing to extend therewithin below said overhanging portion in a position substantially inaccessible manually from said manhole opening, said transformer terminals and cable terminals having exposed contact surfaces for mating engagement upon vertical lowering movement of said casing into operative position in said housing, whereby the likelihood of accidental shock from manual engagement with said terminals is minimized.

2. In an underground alternating-current distribution system having buried primary and secondary cables, a transformer unit comprising a metal housing buried in the soil, said housing having a compartment of restricted dimensions open at the top to the atmosphere, a metal casing within said housing, said casing having external dimensions sufficiently smaller than said internal dimensions to provide air-cooling passages open to the atmosphere, said casing having induction apparatus and a cooling fluid enclosed therein and having transformer terminal members secured thereto, and cable terminals electrically connected to said cables and secured in insulated relationship to said housing to extend therewithin, said transformer terminals and cable terminals having exposed contact surfaces arranged for mating engagement upon vertical lowering movement of said transformer into operative position in said housing, whereby said housing may be compactly designed without tool-space for connecting and disconnecting said terminals.

3. In an underground alternating-current distribution system having buried primary and secondary cables, a transformer unit comprising a housing buried in the soil, a metal casing with said housing and spaced therefrom, said casing having induction apparatus and a cooling fluid enclosed therein and having transformer terminals secured thereto, cable terminals electrically connected to said cables and secured in insulated relationship to said housing to extend therewithin, said transformer terminals and cable terminals having exposed contact surfaces for mating engagement upon vertical lowering movement of said transformer into operative position in said housing, and an air-tight bell member secured to said metal casing in a position to form an air pocket surrounding certain of said contact surfaces.

4. In an underground alternating-current distribution system having buried primary and secondary cables, a transformer unit comprising a metal housing buried in the soil, said housing having openings therein communicating with the atmosphere, an inner metal casing adapted for mounting in said housing in spaced relationship therefrom, said casing having induction apparatus and a cooling fluid therein and having transformer terminals secured thereto, cable terminals electrically connected to said cables and secured in insulated relationship to said housing to extend therewithin, said transformer terminals and cable terminals having exposed contact surfaces for mating engagement upon vertical lowering movement of said casing into operative position in said housing, and an air-tight bell member secured to said metal casing, said bell member having an opening therein positioned to pass freely over certain of said transformer and cable terminals upon vertical lowering movement of said casing into operative position in said housing, said bell member being arranged to form an air pocket surrounding said certain transformer and cable terminals.

5. In an underground alternating-current distribution system, having buried primary and secondary cables, a transformer unit comprising a metal housing buried in the soil, said housing having openings therein communicating with the atmosphere, an inner metal casing adapted for mounting in said housing in spaced relationship therefrom, said casing having an overhanging portion, and having induction apparatus and a cooling fluid enclosed therein, transformer terminals secured to the under side of said overhanging portion, cable terminals electrically connected to said cables and secured in insulated relationship to said housing to extend therewithin, said transformer terminals and certain of said cable terminals having exposed contact surfaces for mating engagement upon vertical lowering movement of said casing into operative position in said housing, and an air-tight bell member secured to said metal casing, said bell member having an opening therein positioned to pass freely over said transformer terminals and said certain of said cable terminals upon vertical lowering movement of said casing into operative position in said housing, said bell member being arranged to form an air pocket surrounding said transformer terminals and said certain of said cable terminals.

6. A removable distribution transformer, designed for connection to stationary terminals, comprising a metal casing, induction apparatus enclosed in said casing, a cooling medium in said casing, transformer terminals connected to said induction apparatus and secured in insulated relationship to said casing, and an air-tight bell member, open at the bottom, secured to said casing in a position to surround said transformer terminals, said transformer terminals having exposed contact surfaces for mating engagement with corresponding surfaces of said stationary terminals upon vertical lowering movement of said transformer into operative position.

JOHN S. PARSONS.